United States Patent
Krude (10) Patent No.: US 7,001,281 B2
(45) Date of Patent: Feb. 21, 2006

(54) CONSTANT VELOCITY BALL JOINT AS A COUNTER TRACK JOINT

(75) Inventor: Werner Krude, Neunkirchen-Seelscheid (DE)

(73) Assignee: GKN Automotive GmbH, (DE)

( * ) Notice: Subject to any disclaimer, the term of this patent is extended or adjusted under 35 U.S.C. 154(b) by 57 days.

(21) Appl. No.: 10/805,712

(22) Filed: Mar. 22, 2004

(65) Prior Publication Data

US 2004/0180725 A1  Sep. 16, 2004

Related U.S. Application Data

(63) Continuation of application No. 10/011,806, filed on Dec. 3, 2001, now Pat. No. 6,709,337.

(30) Foreign Application Priority Data

Dec. 4, 2000  (DE) .............................. 100 60 120

(51) Int. Cl.
*F16D 3/224* (2006.01)

(52) U.S. Cl. ...................... 464/145; 464/906
(58) Field of Classification Search ................ 464/145, 464/146, 906
See application file for complete search history.

(56) References Cited

U.S. PATENT DOCUMENTS

| | | | |
|---|---|---|---|
| 2,875,600 A | * | 3/1959 | Miller, Jr. .................... 464/145 |
| 3,475,924 A | | 11/1969 | Aucktor |
| 3,919,861 A | | 11/1975 | Bellomo |
| 4,678,453 A | | 7/1987 | Aucktor et al. |
| 5,242,329 A | | 9/1993 | Jacob |
| 5,451,185 A | * | 9/1995 | Krude et al. ................ 464/145 |
| 5,531,643 A | | 7/1996 | Welschof |
| 6,261,184 B1 | | 7/2001 | Jacob et al. |
| 6,497,622 B1 | | 12/2002 | Bilz et al. |

FOREIGN PATENT DOCUMENTS

| | | |
|---|---|---|
| DE | 1 251 595 | 4/1968 |
| DE | 40 31 820 C2 | 4/1992 |
| GB | 847 569 | 9/1960 |
| JP | 9042304 | 2/1997 |

OTHER PUBLICATIONS

SAE Universal Joint and Driveshaft Design Manual, AE-7, Society of Automotive Engineers, Warrendale, PA, pp. 163-166, TJ1079.S69 1979.

* cited by examiner

Primary Examiner—Greg Binda

(57) ABSTRACT

A constant velocity ball joint in the form of a counter track joint, has an outer joint part, an inner joint part, and torque transmitting balls received in pairs of tracks formed of outer tracks and inner tracks, and a ball cage. First pairs of tracks whose first control angles open in a first axial direction hold first balls. Second pairs of track whose control angles open in a second axial direction hold second balls. The control angles are defined as angles between the tangents at the ball contact points in the pairs of tracks. The outer joint part and the inner joint part are axially displaceable relative to one another. The first control angle and the second control angle change in opposite senses when a relative axial displacement occurs. The axial displacement path is limited to observing a minimum value of least 8° for the respective smaller control angle.

5 Claims, 8 Drawing Sheets

CONSTANT VELOCITY BALL JOINT AS A COUNTER TRACK JOINT

This is a Continuation of U.S. patent application Ser. No. 10/011,806 filed on Dec. 3, 2001 and issued on Mar. 23, 2004 as U.S. Pat. No. 6,709,337.

TECHNICAL FIELD

The present invention relates to a constant velocity ball joint permitting axial displacement.

BACKGROUND OF THE INVENTION

The most frequent type of plunging joints are so-called VL joints (cross-groove joints) such as according to U.S. Pat. No. 4,678,453 wherein the center lines of the outer tracks and of the inner tracks each form oppositely directed angles of intersection with the longitudinal joint axis and are positioned in planes extending parallel to the longitudinal joint axis or on a cylindrical face around the longitudinal joint axis.

From U.S. Pat. No. 3,133,431, there are known plunging joints wherein the center lines of the outer tracks and of the inner tracks form identically sized angles of intersection with the longitudinal joint axis, i.e., they are positioned in planes which contain the longitudinal joint axis itself.

Both the above-mentioned types of joint are joints with straight tracks.

It would be desirable to provide a new type of plunging joint for large articulation angles and relatively short displacement paths.

SUMMARY OF THE INVENTION

The present invention provides a constant velocity ball joint in the form of a counter track joint. The joint includes an outer joint part with outer tracks, an inner joint part with inner tracks, torque transmitting balls which are received in pairs of tracks consisting of outer tracks and inner tracks which are curved outwardly with reference to the longitudinal joint axis A, and a ball cage with cage windows in which the balls are held in a common plane and are guided on to the angle-bisecting plane when the joint is articulated. First outer tracks, together with first inner tracks, form first pairs of tracks whose first control angles $\beta_1$ open in a first axial direction and in which first balls are held. Second outer tracks, together with second inner tracks, form second pairs of tracks whose second control angles $\beta_2$ open in a second axial direction and in which second balls are held. The control angles $\beta_1$, $\beta_2$ are defined as angles between tangential planes at the ball contact points in the tracks. Further, the outer joint part and the inner joint part are axially displaceable relative to one another and the first control angles $\beta_1$ and the second control angles $\beta_2$ change in opposite senses when a relative axial displacement occurs. The axial displacement path $V_{max}$ is limited to a maximum value that produces a minimum value of at least 8° for the respective smaller control angles $\beta_1$, $\beta_2$. The present joint provides an axial displacement path having at least 0.8 mm, and preferably more than 1.0 mm of play. This is substantially above the axial play of fixed joints, which in comparison is at most 0.5 mm.

In one form of the displacement path, the joint in accordance with the invention provides a way to uncouple axial vibrations and thus contributes towards improving the noise, vibration, harshness (NVH) behavior. The present design is also advantageous in that it is possible to un-fine the surfaces during the machining operations. Also, the design of the tracks provides a joint with axial centering characteristics.

In particular, the tracks are curved as in Rzeppa joints or undercut-free (UF) joints. As a consequence, even with larger articulation angles, there is achieved adequate ball control due to sufficiently large control angles.

By limiting the axial displacement path, it is ensured that the control angles do not become too small as a result of the axial displacement. The stops for delimiting the axial plunging path can become effective exclusively between the outer joint part and the cage, or exclusively between the inner joint part and the cage, or between both pairs simultaneously; in each case when the joint is in the aligned position, in which case the longitudinal axes of the inner joint part and of the outer joint part coincide. As the ball cage is radially set free relative to the inner joint part and to the outer joint part, the joint is characterised by particularly low friction. Furthermore, because of the counter-track formation, it is ensured that the joint is axially self-centering and that the forces acting on the cage are kept within certain limits. In addition, the way in which the balls are enveloped by the tracks in a cross-sectional view is particularly advantageous.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings, fixed joints with counter tracks are compared with inventive joints; both will be described in detail below.

FIG. 1 shows a prior art fixed joint with counter tracks according to the state of the art, having Rzeppa tracks: (a) in a longitudinal section through a pair of counter tracks; (b) in a bent longitudinal section through a cage web.

FIG. 2 shows a prior art fixed joint with counter tracks, having undercut-free (UF) tracks: (a) in a longitudinal section through a pair of counter tracks; (b) in a bent longitudinal section through a cage web.

FIG. 4 shows a detail 4 of FIG. 3 in an enlarged scale: (a) in an axially centered position of the joint; (b) with maximum axial displacement of the joint.

FIG. 5 shows an enlarged detail of a joint similar to that illustrated in FIG. 3 with maximum axial displacement: (a) in a first modified embodiment; (b) in a second modified embodiment.

FIG. 7 shows a detail 7 of FIG. 6 in an enlarged illustration: (a) in an axially centered position of the joint; (b) with maximum axial displacement of the joint.

FIG. 9 shows the detail 9 of FIG. 8 in an enlarged scale: (a) in an axially centered position of the joint; (b) with a maximum axial displacement of the joint.

FIG. 11 shows the detail 11 of FIG. 10 in an enlarged scale: (a) in an axially centered position of the joint; (b) with maximum axial displacement of the joint.

FIG. 12 illustrates the principle of an inventive joint in a longitudinal section through a pair of counter tracks, leaving out the ball cage: (a) with maximum axial displacement in a first direction; (b) in an axially centered position of the joint; (c) with maximum axial displacement in the second direction.

DETAILED DESCRIPTION OF THE INVENTION

Figure 1A:
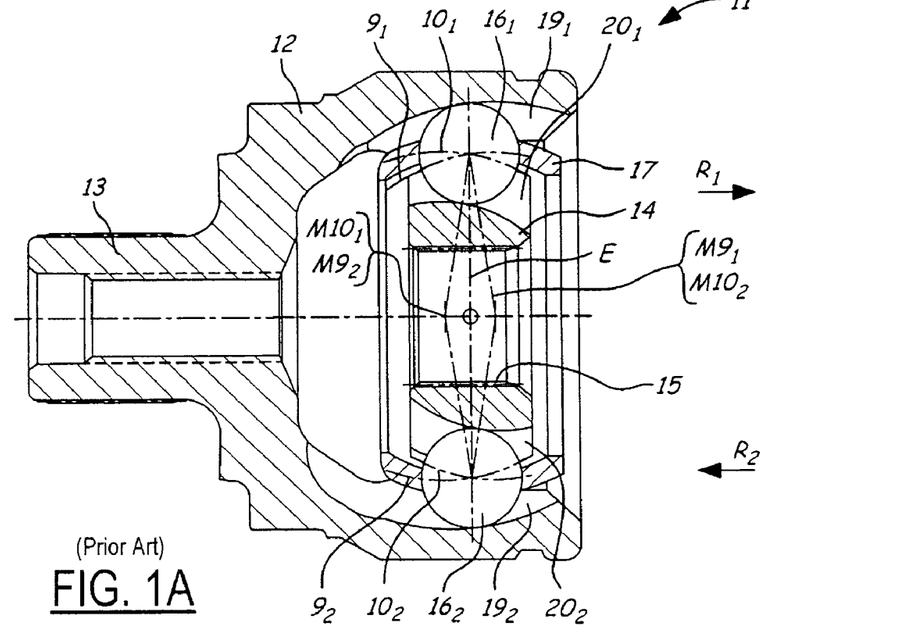
Figure 1B:
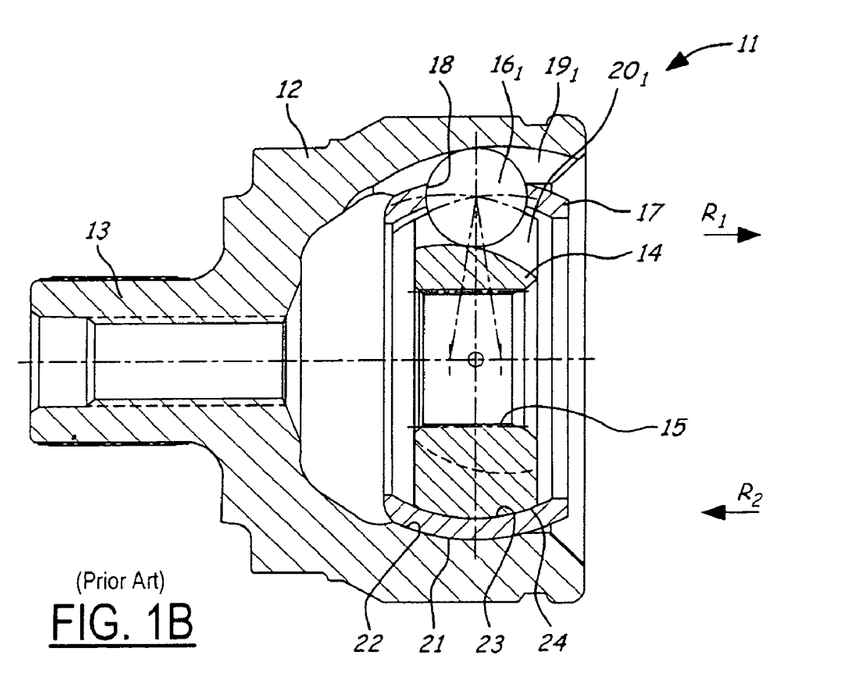
Figure 2A:
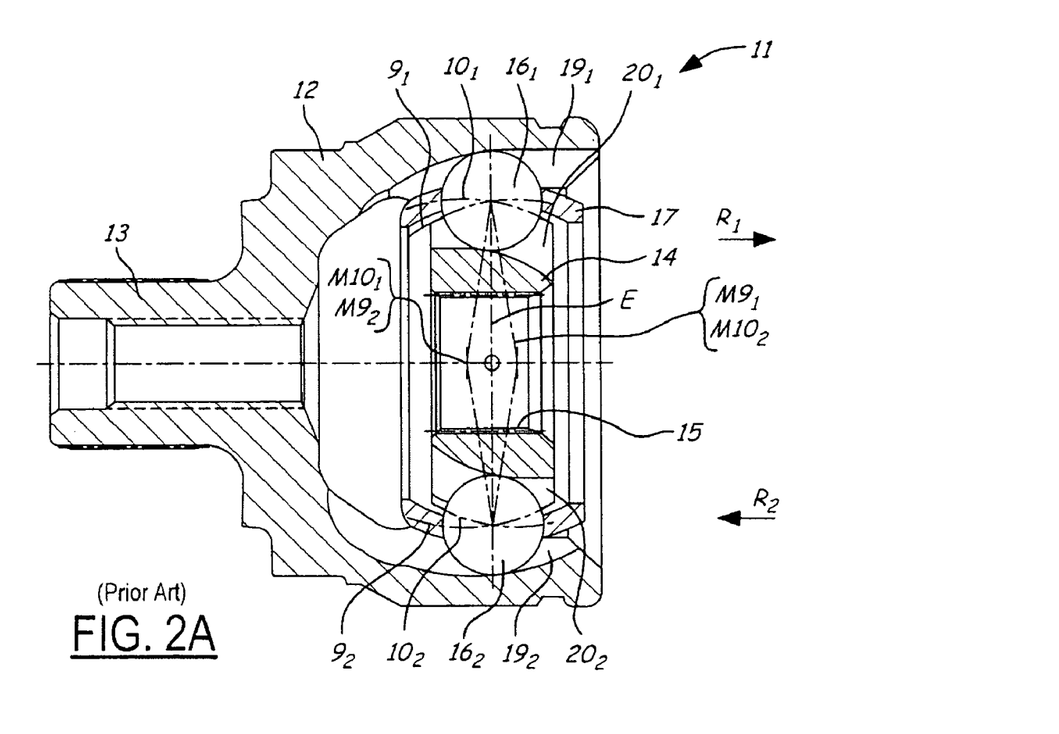
Figure 2B:
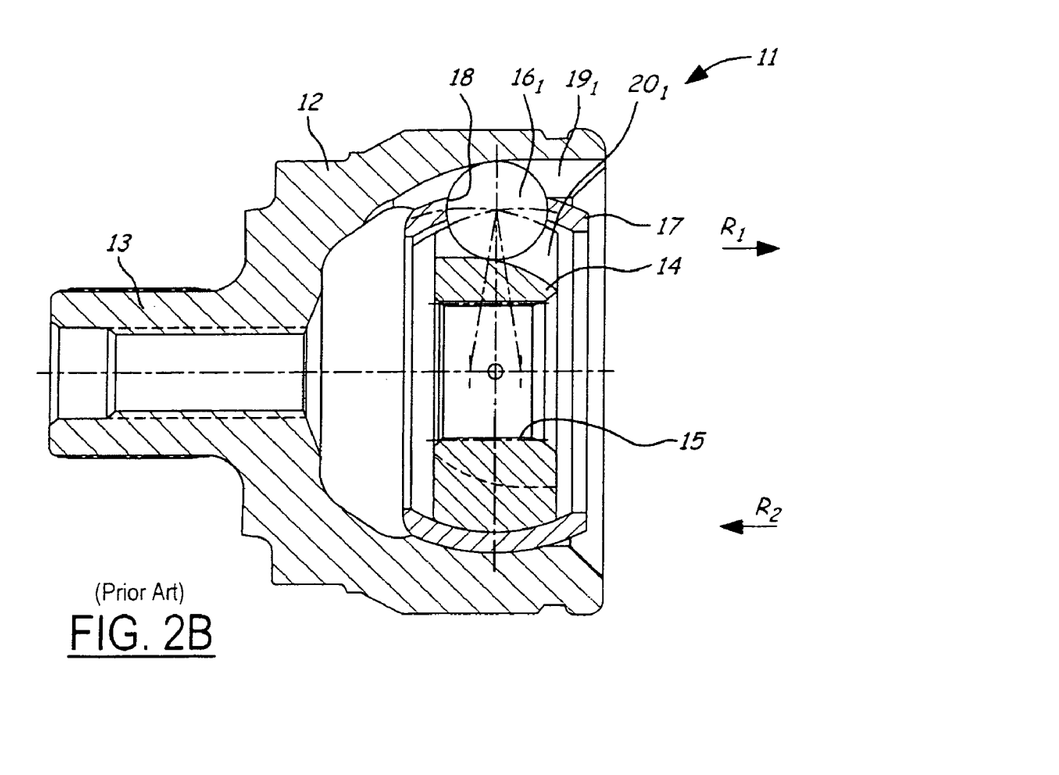

FIGS. 1 and 2 refer to prior art joints for comparative purposes and to complete the description. They will be described jointly. A joint 11 includes an outer joint part 12 with a formed-on journal 13, an inner joint part 14 with a plug-in aperture 15 for a shaft, balls $16_1$, $16_2$ and a cage 17 having windows 18 in which the balls are held. The joints are counter track joints. Thus, first outer ball tracks $19_1$ in the outer joint part 12 and first inner ball tracks $20_1$ in the inner joint part 14, which tracks hold first balls $16_1$, are designed axially oppositely relative to second outer ball tracks $19_2$ in the outer joint part 12 and second inner ball tracks $20_2$ in the inner joint part 14, which tracks hold second balls $16_2$. The first pairs of tracks $19_1$, $20_1$ have control angles which open in a first direction $R_1$. The second pairs of tracks $19_2$, $20_2$ have control angles which open in a second direction $R_2$. The counter track formations are achieved in that the centers of curvature of the outer ball tracks $19_1$, $19_2$ in the outer joint part are circumferentially alternately offset in opposite axial directions relative to the central joint plane E, and equally, the centers of curvature of the inner ball tracks $20_1$, $20_2$ in the inner joint part 14 are circumferentially alternately offset in opposite axial directions relative to the central joint plane E. The central joint plane is defined by the centers of the balls.

The ball cage 17 includes a spherical outer face 21 which is guided in a spherical inner face 22 of the outer joint part 12. Furthermore, the cage includes a spherical inner face 23 in which there is guided a spherical outer face 24 of the inner joint part 14. As a result of this configuration, the joints become fixed joints.

The track center lines $9_1$, $10_1$ of the tracks $19_1$, $20_1$ as well as the track center lines $9_2$, $10_2$ of the tracks $19_2$, $20_2$ intersect one another in the central joint plane E when the joint is in the aligned condition. Whereas in FIG. 1, the center lines 9, 10 of the tracks are entirely circular arches, the center lines 9, 10 of the tracks in FIG. 2 are formed by circular arches with an adjoining axis-parallel tangent.

Figure 3:
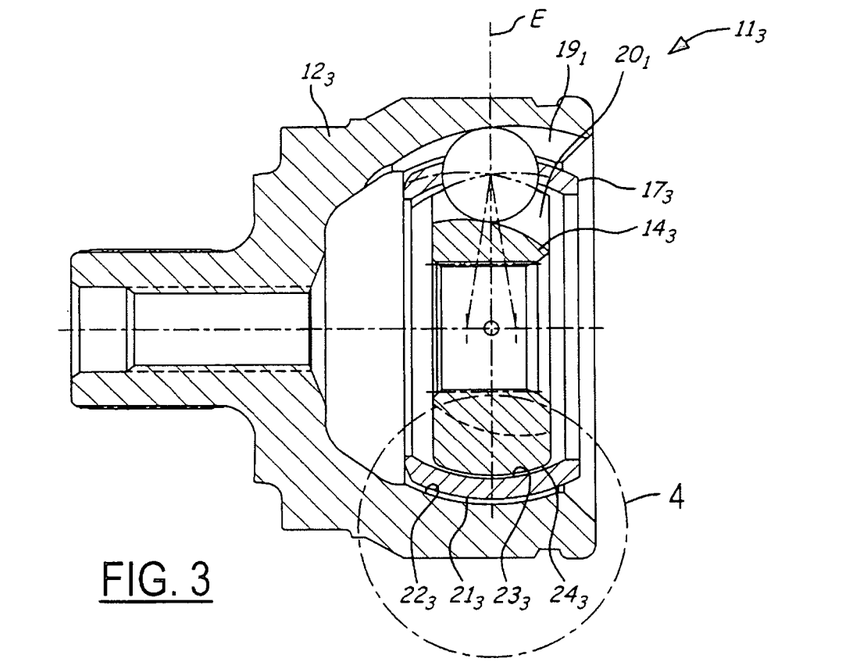
FIG. 3 shows an inventive joint in a first embodiment with Rzeppa tracks in a bent longitudinal section through a cage web.

FIG. 3 shows a joint $11_3$ which is similar to that shown in FIG. 1 but differs substantially in certain details. The details which correspond to one another have been given the same reference numbers. To that extent, reference is made to the description above. In particular, reference is made to the illustrated outer tracks $19_1$, and inner tracks $20_1$ as well as to the outer tracks $20_2$ and inner tracks $20_2$ which are not shown in FIG. 3 for simplification. The details which deviate from FIG. 1 have been given the index 3 and will be referred to below. With the joint of FIG. 3, the spherical outer face $21_3$ of the ball cage $17_3$ is arranged at a radial distance from the spherical inner face $22_3$ of the outer joint part $12_3$. Furthermore, the spherical inner face $23_3$ of the ball cage $17_3$ is arranged at a radial distance from the spherical outer face $24_3$ of the inner joint part $14_3$. As a result, there is achieved, as will be explained in greater detail below, a relative axial displaceability between the outer joint part $12_3$ and the inner joint part $14_3$, with the ball cage $17_3$ setting itself to half the path.

Figure 4A:
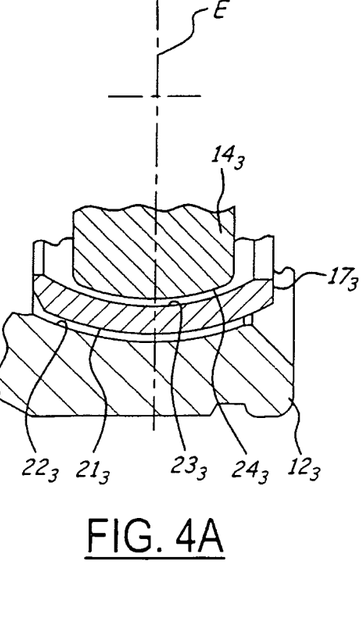

In FIG. 4a, in the enlarged detail 4 of FIG. 3, any details corresponding to those in FIG. 3 have been given the same reference numbers, with reference being made to the previous description.

Figure 4B:
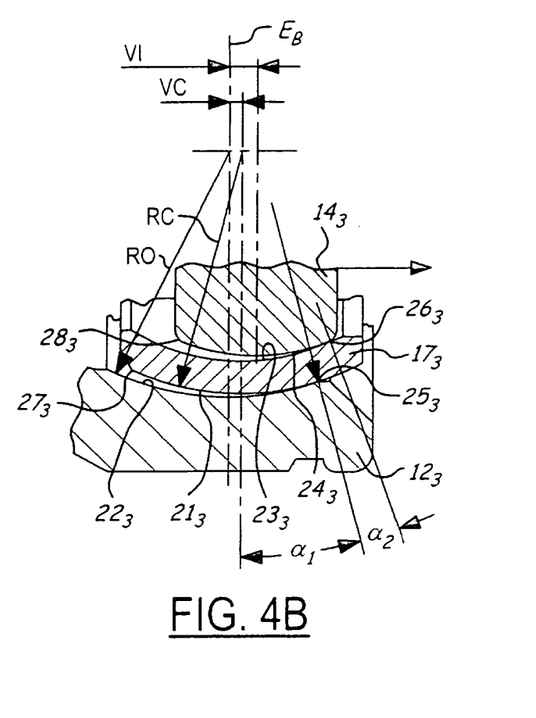

In FIG. 4b, the enlarged detail 4 of FIG. 3 is in a modified position, with the central joint plane, in its relative position relative to the outer joint part $12_3$, being arbitrarily used as the reference plane $E_B$. With respect hereto, the inner joint part $14_3$ is axially moved towards the right by the displacement path VI, whereas the ball cage $17_3$ is moved towards the right by half the size of the displacement path VC. In this position, an inner edge $25_3$ of the outer joint part $12_3$ stops against the outer face $21_3$ of the ball cage $17_3$, whereas at the same time an outer edge $26_3$ of the inner joint part $14_3$ stops against the inner face $23_3$ of the ball cage $17_3$. An outer edge $27_3$ of the ball cage and a second outer edge $28_3$ of the inner joint part form corresponding stops, with the displacement path of the same size extending in the opposite direction. An angle $\alpha_1$ at the ball cage is the angle between the central plane of the ball cage and the line of contact with the edge $25_3$, and an angle $\alpha_2$ at the ball cage $17_3$ is the angle between the central plane of the ball cage and the line of contact with the edge $26_3$. The radius of the inner face $22_3$ at the outer joint part has been given the reference symbol RO and the radius of the face $21_3$ at the ball cage has been given the reference symbol RC.

Figure 5A:
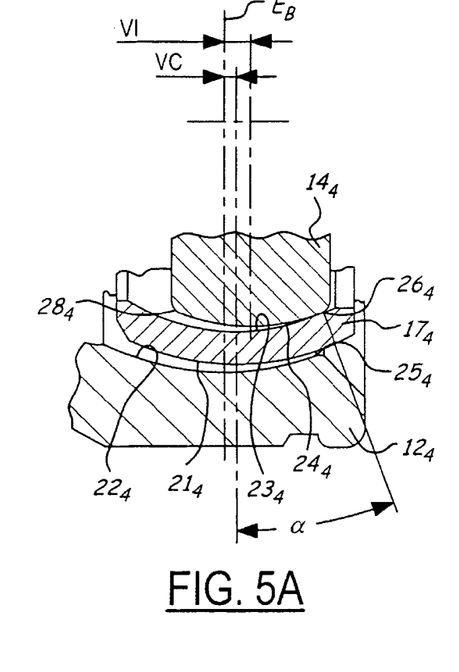

FIG. 5a shows part of a modified inventive joint similar to that illustrated in FIG. 4b. Identical parts have been given identical reference numbers, but are identified by the index 4. As a result of modified radii, only one circumferential edge $26_4$ of the inner joint part $14_4$ touches the inner face $23_4$ of the ball cage $17_4$, whereas in this axial stopping position, the outer face $21_4$ of the ball cage $17_4$ still has radial play relative to the inner edge $25_4$ of the outer joint part $12_4$. A second outer edge $28_4$ of the inner joint part forms a corresponding stop, with the displacement path of the same size extending in the opposite direction. An angle $\alpha$ at the ball cage $17_4$ is the angle between the displaced central plane and a radius through the contacting edge.

Figure 5B:
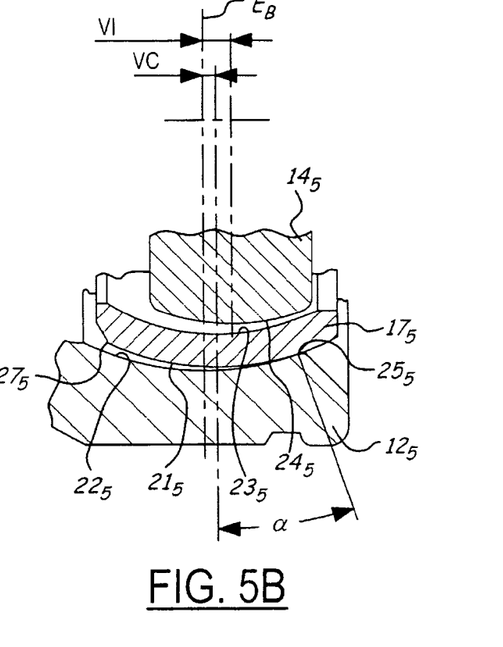

FIG. 5b shows part of a modified inventive joint similar to that illustrated in FIG. 4b. Identical parts have been given identical reference numbers, but are identified by the index 5. As a result of modified radii, only one circumferential edge $25_5$ of the outer joint part $12_5$ touches the outer face $21_5$ of the ball cage $17_5$, whereas in this axial stopping position, the inner face $23_5$ of the ball cage $17_5$ still has radial play relative to the outer face $24_5$ of the inner joint part $14_5$. An outer edge $27_5$ of the ball cage forms a corresponding stop, with the displacement path of the same size extending in the opposite direction. An angle $\alpha$ at the ball cage $17_5$ is the angle between the displaced central plane and a radius through the contacting edge.

Figure 6:
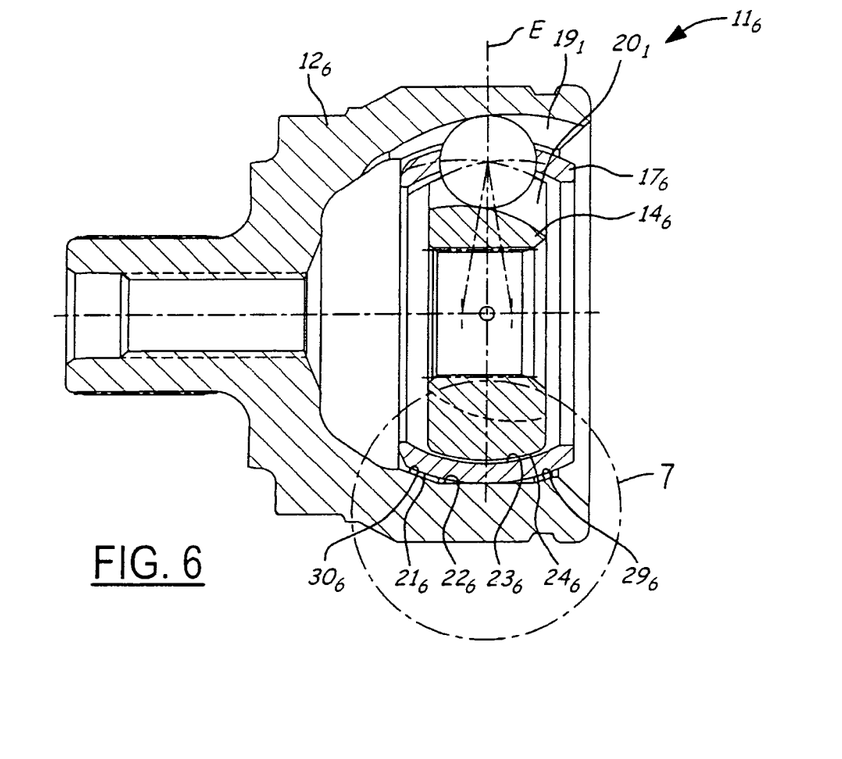
FIG. 6 shows an inventive joint in a second embodiment with Rzeppa tracks in a bent longitudinal section through a cage web.

FIG. 6 shows a joint $11_6$ which is similar to that shown in FIG. 1 but differs substantially in certain details. The details which correspond to one another have been given the same reference numbers. To that extent, reference is made to the description above. In particular, reference is made to the illustrated outer tracks $19_1$ and inner tracks $20_1$ as well as to the outer tracks $19_2$ and inner tracks $20_2$ which are not shown in FIG. 6, for simplification. The details which deviate from FIG. 1 have been given the index 6 and will be referred to below. With the joint of FIG. 6, the spherical outer face $21_6$ of the ball cage $17_6$ is radially centered in an internally cylindrical inner face $22_6$ of the outer joint part $12_6$, but has axial play relative to two adjoining internally conical stop faces $29_6$, $30_6$. Furthermore, the inner face $23_6$ of the ball cage $17_6$ is arranged at a radial distance from the spherical outer face $24_6$ of the inner joint part $14_6$. As a result, there is achieved, as will be explained in greater detail below, a relative axial displaceability between the outer joint part $12_6$ and the inner joint part $14_6$, with the ball cage $17_6$ setting itself to half the displacement path.

Figure 7A:
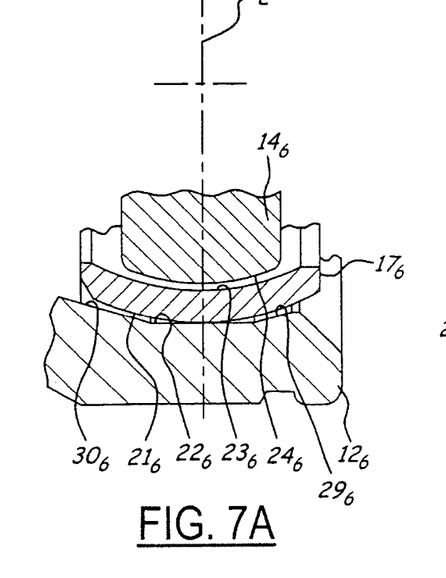

In FIG. 7a, in the enlarged detail 7 of FIG. 6, the same details as in FIG. 6 have been given the same reference numbers, with reference being made to the previous description.

Figure 7B:
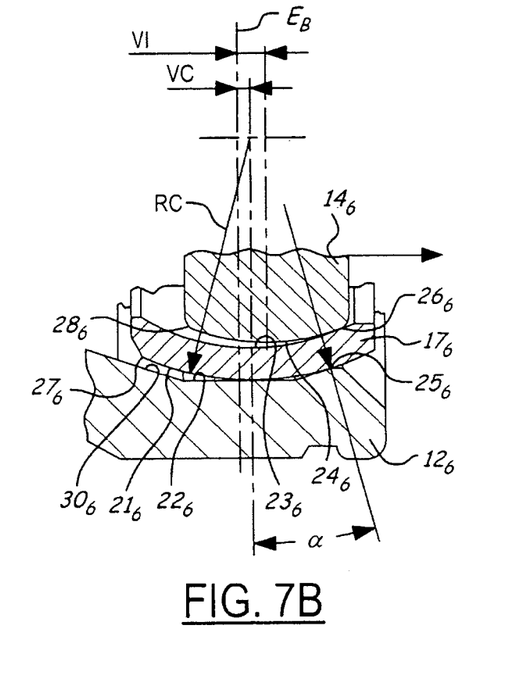

In FIG. 7b, the enlarged detail 7 of FIG. 6 is in a modified position, with the central joint plane, in its relative position relative to the outer joint part $12_6$, being arbitrarily used as the reference plane $E_B$. With reference hereto, the inner joint part $14_6$ is axially moved towards the right by the displacement path VI, whereas the ball cage $17_6$ is moved towards the right by half the size of the displacement path VC. In this position, an inner edge $25_6$ of the outer joint part $12_6$ stops against the outer face $21_6$ of the ball cage $17_6$, whereas at the same time an outer edge $26_6$ of the inner joint part $14_6$ stops against the inner face $23_6$ of the ball cage $17_6$. An outer edge $27_6$ of the ball cage and a second outer edge $28_6$ of the inner joint part form corresponding stops, with the displacement path of the same size extending in the opposite direction. An angle $\propto$ at the ball cage $17_6$ is the angle between the central plane of the ball cage and the line of contact with the edge $25_6$. The radius of the face $21_6$ at the ball cage has been given the reference symbol RC.

Figure 8:
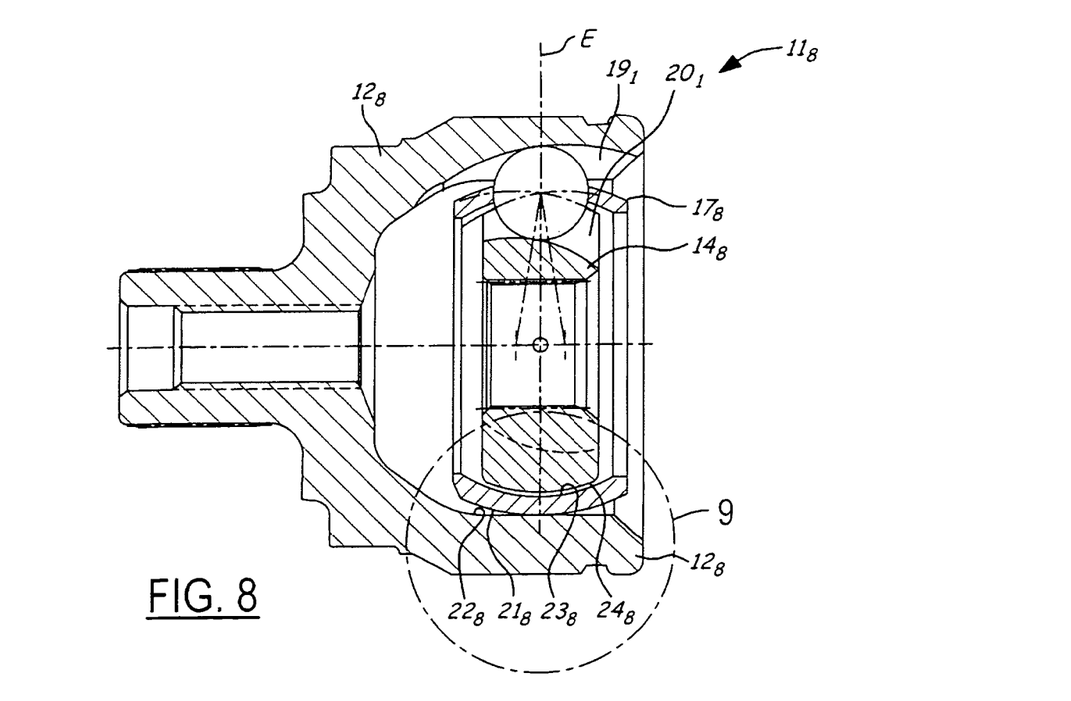
FIG. 8 shows an inventive joint in a third embodiment with Rzeppa tracks in a bent longitudinal section through a cage web.

FIG. 8 shows a joint $11_8$ which is similar to that shown in FIG. 1, but differs substantially in certain details. The details which correspond to one another have been given the same reference numbers. To that extent, reference is made to the description above. In particular, reference is made to the illustrated outer tracks $19_1$ and inner tracks $20_1$ as well as to the outer tracks $19_2$ and inner tracks $20_2$ which are not shown in FIG. 8, for simplification. The details which deviate from FIG. 1 have been given the index 8 and will be referred to below. With the joint of FIG. 8, the spherical outer face $21_8$ of the ball cage $17_8$ is radially centered in the cylindrical inner face $22_8$ of the outer joint part $12_8$. Furthermore, the inner face $23_8$ of the ball cage $17_8$ is arranged at a radial distance from the spherical outer face $24_8$ of the inner joint part $14_8$. As a result, there is achieved, as will be explained in greater detail below, a relative axial displaceability between the outer joint part $12_8$ and the inner joint part $14_8$, with the ball cage $17_8$ setting itself to half the displacement path.

Figure 9A:
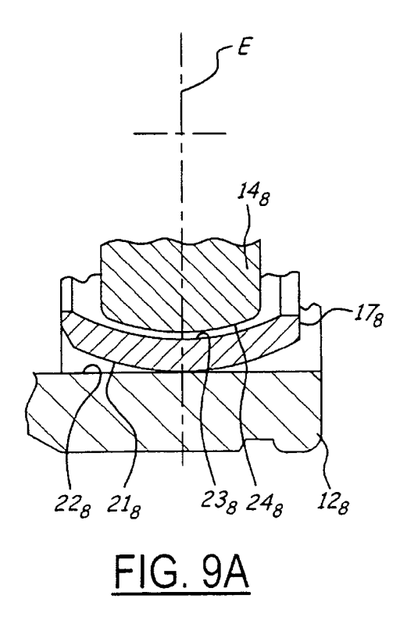

In FIG. 9a, in the enlarged detail 9 of FIG. 8, the same details as in FIG. 8 have been given the same reference numbers, with reference being made to the previous description.

Figure 9B:
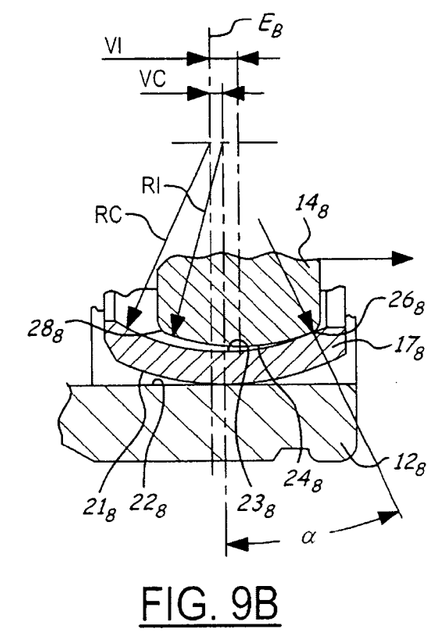

In FIG. 9b, the enlarged detail 9 of FIG. 8 is in a modified position, with the central joint plane, in its relative position relative to the cuter joint part $12_8$, being arbitrarily used as the reference plane $E_8$. With reference hereto, the inner joint part $14_8$ is axially moved towards the right by the displacement path VI, whereas the ball cage $17_8$ is moved towards the right by half the size of the displacement path VC. In this position, an outer edge $26_8$ of the inner joint part $12_8$ stops against the inner face $23_8$ of the ball cage $17_8$. A second outer edge $28_8$ of the inner joint part forms a corresponding stop, with the displacement path of the same size extending in the opposite direction. An angle $\propto$ at the ball cage $17_8$ is the angle between the central plane of the ball cage and the line of contact with the edge $26_8$. The radius of the outer face $24_8$ at the inner joint part has been given the reference symbol RI and the radius at the inner face $21_8$ at the ball cage has been given the reference symbol RC.

Figure 10:
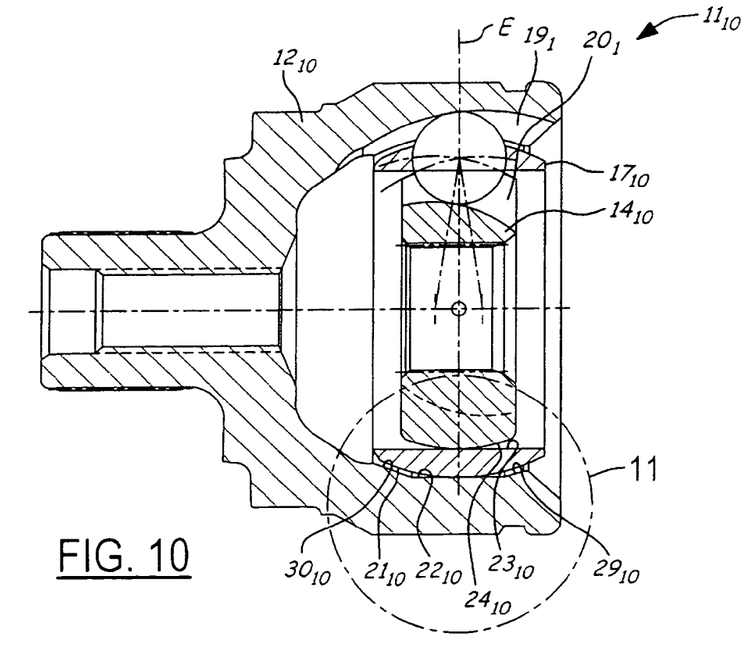
FIG. 10 shows an inventive joint in a fourth embodiment with Rzeppa tracks in a bent section through a cage web.

FIG. 10 shows a joint $11_{10}$ which is similar to that shown in FIG. 1, but differs substantially in certain details. The details which correspond to one another have been given the same reference numbers. To that extent, reference is made to the description above. In particular, reference is made to the illustrated outer tracks $19_1$ and inner tracks $20_1$ as well as to the outer tracks $19_2$ and inner tracks $20_2$ which are not shown in FIG. 10, for simplification. The details which deviate from FIG. 1 have been given the index 10 and wilt be referred to below. With the joint of FIG. 10, the spherical outer face $21_{10}$ of the ball cage $17_{10}$ is radially centered in an internally cylindrical inner face $22_{10}$ of the outer joint part $12_{10}$ but has axial play relative to two adioinincj internally conical ston faces $29_{10}$, $30_{10}$. Furthermore, the spherical outer face $24_{10}$ of the inner joint part $14_{10}$ is centered in the internally cylindrical inner face $23_{10}$ of the ball cage $17_{10}$ As a result, there is achieved, as will be explained in greater detail below, a relative axial displaceability between the outer joint part $12_{10}$ and the inner joint part $14_{10}$, with the ball cage $17_{10}$ setting itself to half the displacement path.

Figure 11A:
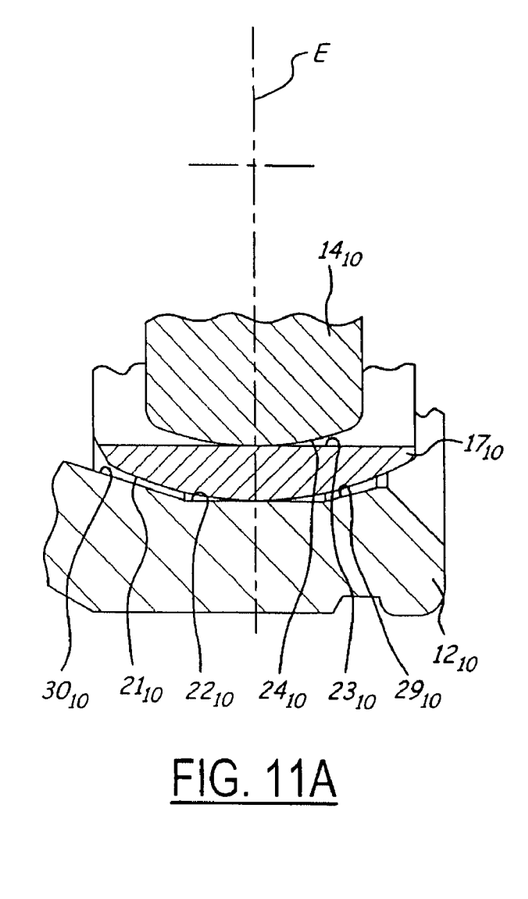

In FIG. 11a, in the enlarged detail 11 of FIG. 10, the same details as in FIG. 10 have been given the same reference numbers, with reference being made to the previous description.

Figure 11B:
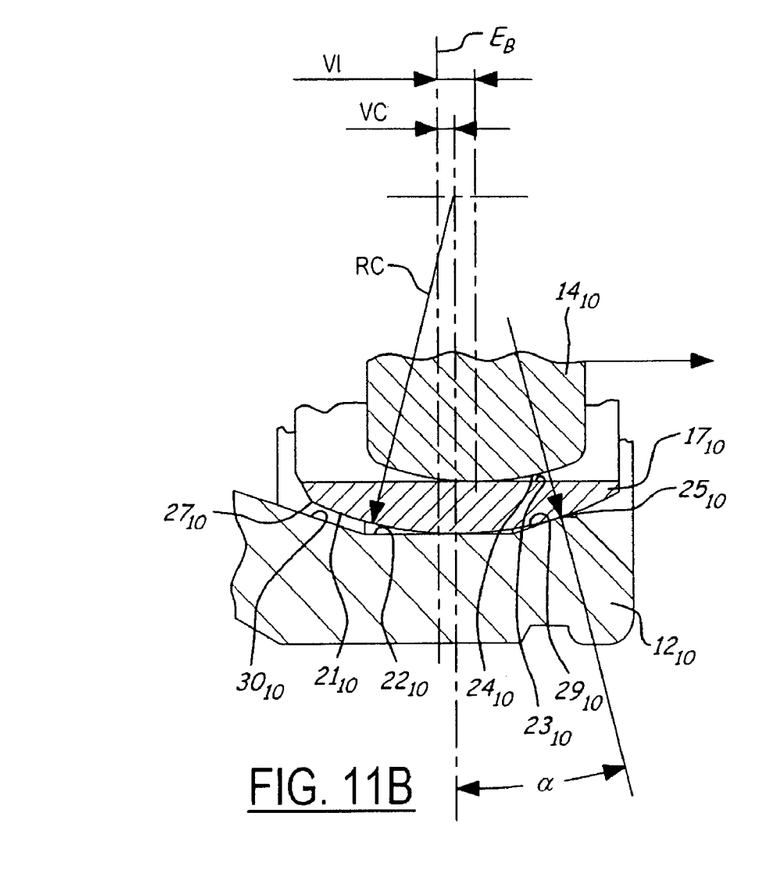

In FIG. 11b, the enlarged detail 11 of FIG. 10 is in a modified position, with the central joint plane, in its relative position relative to the outer joint part $12_{10}$. being arbitrarily used as the reference plane $E_B$. With respect hereto, the inner joint part $14_{10}$ is axially moved towards the right by the displacement path VI, whereas the ball cage $17_{10}$ is moved towards the right by half the size of the displacement path VC. In this position, circumferential face $25_{10}$ of the outer Joint part $12_{10}$ stops against the outer face $21_{10}$ of the ball cage $17_{10}$ while the outer face $24_{10}$ of the inner joint part $14_{10}$ is not axially limited by the inner face $23_{10}$ of the ball cage $17_{10}$. An outer edge $27_{10}$ of the ball cage forms a corresponding stop, with the displacement path of the same size extending in the opposite direction. An angle $\propto$ at the ball cage $17_{10}$ is the angle between the central plane of the ball cage and the line of contact with the circumferential entialface $25_{10}$. The radius of the face $21_{10}$ at the ball cage has been given the reference symbol RC.

Figure 12A:
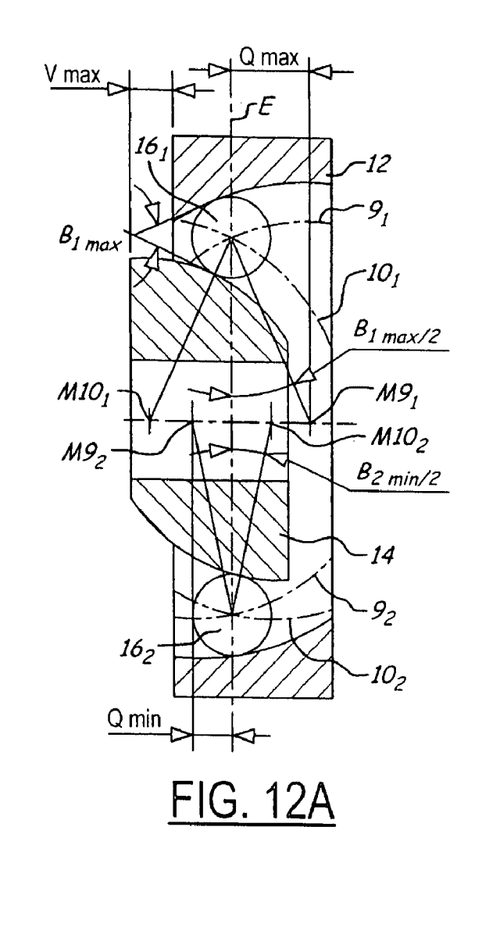
Figure 12B:
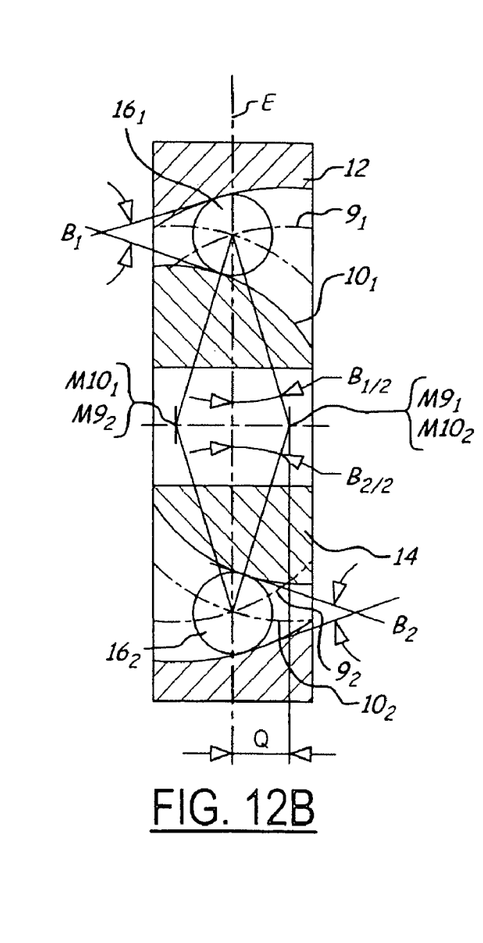
Figure 12C:
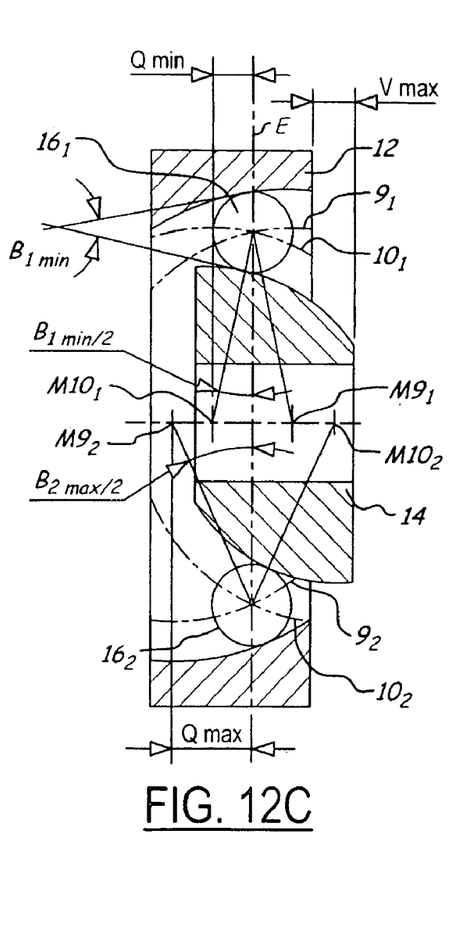

FIG. 12 illustrates the principle of an inventive joint in a longitudinal section through a pair of counter tracks, without the bail cape; (a) with maximum axial displacement in a first direction; (b) in an axially centered position of the joint; and (c) with maximum axial displacement in the second direction. The outer joint part 12, the inner joint part 14 and the balls 16 carry the same reference numbers as used in FIG. 1, in all three illustrations, the central plane defined by the ball centers is referred to as the central joint plane E, i.e., a new artificial reference plane is not introduced. The tracks 19, 20 are referred to by their track base lines and their track center lines 9, 10 only. For the sake of simplicity, the track edges have also been eliminated. The position of the balls is defined by the points of intersection of the track center lines 9, 10. As a result of the relative displacement $V_{max}$ between the outer joint part and the inner joint part, the centers of curvature of the track center lines 9, 10 are displaced relative to one another, as a result of which the control angles between the associated track center lines 9, 10 simultaneously change in opposite senses, i.e. the one increases, the other decreases. The minimum distance of the centers of curvature from the central joint plane E is referred to as $Q_{min}$ and the maximum distance of the centers of curvature from the central joint plane E is referred to as $Q_{max}$. The angles between the radii positioned perpendicularly on the tangents in the points of intersection of the track center lines correspond to the control angles $\beta_1$, $\beta_2$ between said, track center lines. Each half of said angles between the radii is referred to as $\beta_{min/2}$, $\beta_{min/2}$. The axial displacement is to be delimited to such an extent that $\beta_{min/2}$ is not less than 4° and that the smallest control angle $\beta_{min}$ thus is not less than 8°. In the Figures, reference letter M represents the center of curvature for the respective ball tracks having the corresponding number. Thus, for example, $M9_2$ is the center of curvature of the center lines of the second inner ball tracks $9_2$.

From the foregoing, it can be seen that there has been brought to the art a new and improved constant velocity joint. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A constant velocity ball joint in the form of a counter track joint, comprising:

an outer joint part with outer tracks, an inner joint part with inner tracks, torque transmitting balls which are received in pairs of tracks comprising said outer tracks and inner tracks which are curved outwardly with reference to a longitudinal joint axis, and a ball cage with cage windows in which the balls are held in a common plane and are guided on to an angle-bisecting plane when the joint is articulated;

first outer tracks, together with first inner tracks, form first pairs of tracks whose first control angles ($\beta_1$) open in a first axial direction ($R_1$) and in which first balls are held; and second outer tracks, together with second inner tracks, form second pairs of tracks whose second control angles ($\beta_2$) open in a second axial direction ($R_2$) and in which second balls are held;

wherein the control angles ($\beta_1$, $\beta_2$) are defined as angles between tangents at ball contact points in the tracks pairs; and wherein the outer joint part and the inner joint part are axially displaceable relative to one another and the first control angles ($\beta_1$) and the second control angles ($\beta_2$) change in opposite senses when a relative axial displacement occurs, the axial displacement path ($V_{max}$) being limited to a maximum value that changes the control angles ($\beta_1$, $\beta_2$) so as to be not less than 8° for the smaller of the respective control angles ($\beta_1$, $\beta_2$), wherein an inner face of the outer joint part is cylindrical, and wherein the axial displacement path is delimited in each direction by a circumferential face in the outer joint part stopping against a spherical outer face of the ball cage.

2. A joint according to claim 1, wherein the circumferential faces comprise conical stop faces in the outer joint part which are connected to one another by an inner cylinder.

3. A joint according to claim 2, wherein in an axially centered position of the joint the ball cage exhibits axial play relative to the conical stop faces of the outer joint part.

4. A constant velocity ball joint in the form of a counter track joint, comprising:

an outer joint part with outer tracks, an inner joint part with inner tracks, torque transmitting balls which are received in pairs of tracks comprising said outer tracks and inner tracks which are curved outwardly with reference to a longitudinal joint axis, and a ball cage with cage windows in which the balls are held in a common plane and are guided on to an angle-bisecting plane when the joint is articulated;

first outer tracks, together with first inner tracks, form first pairs of tracks whose first control angles ($\beta_1$) open in a first axial direction ($R_1$) and in which first balls are held; and second outer tracks, together with second inner tracks, form second pairs of tracks whose second control angles ($\beta_2$) open in a second axial direction ($R_2$) and in which second balls are held;

wherein the control angles ($\beta_1$, $\beta_2$) are defined as angles between tangents at ball contact points in the tracks pairs; and wherein the outer joint part and the inner joint part are axially displaceable relative to one another between axial stooping positions, and the first control angles ($\beta_1$) and the second control angles ($\beta_2$) change in opposite senses when a relative axial displacement occurs, the axial displacement path ($V_{max}$) being limited to a maximum value that changes the control angles ($\beta_1$, $\beta_2$) so as to be not less than 8° for the smaller of the respective control angles ($\beta_1$, $\beta_2$), wherein an inner face of the outer joint part includes two conical stop faces connected to one another by an inner cylinder, and wherein in said axial stopping positions, an outer face of the inner joint part is not axially limited relative to an inner face of the ball cage.

5. A joint according to claim 4, wherein in an axially centered position of the joint the ball cage exhibits axial play relative to the conical stop faces of the outer joint part.

* * * * *

UNITED STATES PATENT AND TRADEMARK OFFICE
CERTIFICATE OF CORRECTION

| | |
|---|---|
| PATENT NO. | : 7,001,281 B2 |
| APPLICATION NO. | : 10/805712 |
| DATED | : February 21, 2006 |
| INVENTOR(S) | : Werner Krude |

It is certified that error appears in the above-identified patent and that said Letters Patent is hereby corrected as shown below:

Column 6,
Line 17, should read as follows: -- $12_{10}$ but has axial play relative to two adjoining internally --

Line 18, should read as follows: -- conical stop faces $29_{10}$, $30_{10}$. Furthermore, the spherical --

Line 45, should read as follows: -- face $25_{10}$. The radius of the face $21_{10}$ at the ball cage --

Line 49, should read as follows: -- the ball cage; (a) with maximum axial displacement in a first --

Column 8,
Line 36, should read as follows: -- axial stopping positions, and the first control angles --

Signed and Sealed this

Eighteenth Day of July, 2006

JON W. DUDAS
*Director of the United States Patent and Trademark Office*